United States Patent Office 3,281,488
Patented Oct. 25, 1966

3,281,488
CONVERSION OF CONJUGATED DIENES TO FILM-FORMING OR DRYING OILS AND THE LIKE
Alfred Clark and Vernon C. F. Holm, Bartlesville, Okla., assignors to Phillips Petroleum Company, a corporation of Delaware
No Drawing. Filed Mar. 12, 1963, Ser. No. 264,693
8 Claims. (Cl. 260—680)

This invention relates to the conversion of a conjugated diolefin to a polymer which can be used for film-forming purposes, as a drying oil, etc.

In one of its aspects, the invention relates to a process for the conversion of a conjugated diolefin, such as an acyclic diolefin having from 4 to about 15 carbon atoms per molecule, to a liquid oily polymer by contacting the same with an alumina catalyst containing fluorine in an approximate range of from about 2 to about 20 weight percent, the polymer thus obtained exhibiting fast-drying and flexible dried film properties of an improved drying oil or drying oil constituent. In another of its aspects, the invention relates to the use of a fluorided alumina polymerization catalyst prepared by contacting an alumina catalyst with a spent alkylation catalyst consisting essentially of hydrofluoric acid and/or fluorine containing organic materials therein by virtue of its having been used to cause alkylation of organic compounds, to polymerize a conjugated diene to form a liquid oily polymer, heavier than the dimer, the polymer thus obtained being preeminently useful as at least a constituent of a fast-drying drying oil or as at least a constituent of a material yielding a flexible dried film of improved properties such as hardness and durability.

The conversion or polymerization of conjugated dienes, such as 1,3-butadiene, to substantially a dimer product is known. Activated alumina and other solid contact catalysts, such as fuller's earth, bauxite and silica gel, have been proposed as favoring the formation of the dimer in both liquid and vapor phase. U.S. Patent 2,355,-392, issued August 8, 1944, to George G. Oberfell, describes such a process.

We have found that it is possible to convert or to considerably polymerize a conjugated diene, such as 1,3-butadiene, to liquid oily polymers having an average molecular weight substantially in excess of that of the dimer product. Thus, we have found that by impregnating or otherwise including a minor, yet appreciable, amount of fluorine in an alumina catalyst results, upon activation of said catalyst at an elevated temperature, a polymerization catalyst which will produce a liquid oily polymer which exhibits the fast-drying and flexible dried film properties of an improved drying oil constituent. Thus such a liquid polymer has been found to dry after only about 4 hours exposure to air and the dried film thus obtained exhibits unusual flexibility. The utility of such a drying oil or drying oil constituent is obvious to one skilled in this art.

It is an object of this invention to polymerize a conjugated diolefin to prepare a polymer. It is another object of this invention to provide a catalyst suitable for polymerizing a conjugated diolefin to a polymer having an average molecular weight in excess of the dimer product. It is a further object of this invention to utilize a spent alkylation catalyst consisting essentially of hydrofluoric acid containing materials therein resulting from its use in said alkylation, in the preparation of a polymerization catalyst suitable for producing liquid oily polymers of conjugated dienes. A further object of this invention is to provide a new fast-drying and flexible dried film polymeric constituent.

Other aspects, objects and the several advantages of this invention are apparent from this description and the appended claims.

According to the present invention there is provided a process for the polymerization of a conjugated diolefin to a liquid polymer heavier than a dimer of said diolefin which comprises subjecting said diolefin to the action of a fluorided alumina catalyst containing approximately 2–20 weight percent of fluorine.

The catalyst provided by this invention for the polymerization reaction of the invention can be prepared by any method known to one skilled in the art and the polymerization reaction can be effected simply by heating the diolefin in contact with the catalyst to a temperature and for a time sufficient to produce the oily liquid polymer which will result when the steps here described are effected. The temperature at which initial polymerization will be induced will vary somewhat depending upon the exact nature of the catalyst which has been prepared and the diolefin as well as the degree and time of contact of the diolefin with said catalyst. Generally, the operation can be conducted in both vapor and liquid phases. However, vapor phase is now preferred. Further, a diluent, which is substantially inert in the operation, can be employed. When employed, such a diluent will preferably be a saturated acyclic or cyclic hydrocarbon, as later described. The operation is a simple one for one skilled in the art to understand. Thus, given that a fluorided alumina catalyst has been found to induce polymerization of a conjugated diene, as herein described, to produce an oily liquid polymer heavier than the dimer, one skilled in the art will know how to go about producing the said product.

It is unexpected to find that fluoriding of an alumina catalyst would impart to the alumina polymerization activity sufficient to produce oily polymers of 1,3-butadiene, as distinguished from the dimer product. Thus the fact that oily polymers can be obtained by simply fluoriding the alumina is a discovery which forms a principal concept of the invention, which now will be further described in order to supply the disclosure of the manner of operation and preparation of the catalysts which now are preferred.

Polymerizable monomers applicable to the process of the present invention are those acyclic conjugated diolefins having from 4 to 15 carbon atoms per molecule. Some examples of these are: 1,3-butadiene, isoprene, 5-ethyl-1,3-heptadiene, 5-methyl-6-ethyl-1,3-octadiene, 2,3-dimethyl-1,3-pentadiene, 4,5,5-trimethyl-1,3-dodecadiene, and the like.

The catalyst of the present invention is prepared by impregnating a conventional catalyst grade alumina such as a natural or synthetic alumina cracking catalyst with a fluorine-containing compound. Preferably, the alumina is in a particulate condition of about 6–300 mesh size and the fluoriding compound is such that the subsequent calcination will leave a fluorine residue without significant quantities of other elements. The preferred fluorine content is in the range of about 2 to about 20 and preferably about 4 to about 10 weight percent based on the total composite. Preferred fluoriding agents are hydrogen fluoride, ammonium fluoride, and ammonium acid fluoride. After impregnation, generally carried out by contacting the alumina with an aqueous solution of the fluoriding agent, the wet composite is first dried and then activated at elevated temperatures. The activation is carried out in air in the temperature range from about 400 to about 800° C. and for periods of about 0.1 to about 50 hours. Spent catalyst is regenerated by repeating the air activation treatment.

An alternative technique for fluoriding the alumina utilizes an acid soluble oil obtained from an HF alkylation of hydrocarbons. (For a description of this process see "Hydrofluoric Acid Alkylation" published by the Phillips Petroleum Co., Bartlesville, Oklahoma, 1946.) This material is associated with the spent hydrofluoric acid catalyst and contains organic fluoride compounds. Depending upon its extent of prior use in the alkylation process or whether it has been subjected to acid recovery steps, the organic fluoride containing oil can also contain minor quantities of hydrogen fluoride. Thus, this fluoride containing material can be admixed with the alumina and subjected to the activation heating as described above. The organic fluorides break up, form non-volatile compositions with the alumina, and provide an active fluorided catalyst.

In operation, according to the process of the invention, the diolefin charge and catalyst are contacted at a temperature in the range of about 80 to about 250° C., preferably in the range of about 100–150° C., at a pressure of approximately atmospheric to 2,000 p.s.i.g. Contact time will usually range from about 0.01 minute to about 10 hours, preferably 0.5–5 hours, depending upon the reaction conditions and the degree of conversion desired. When a diluent is employed and is a hydrocarbon diluent it will contain about 3 to about 12 carbon atoms per molecule. Mixed diluents can be employed. The diluent can be used in amounts up to and exceeding 100 weight parts diluent per part polymerizable monomer or mixture of monomers.

The usual polymerization techniques such as batch or continuous operation including fixed or moving polymerization catalyst bed system, a stirred batch reactor or a continuous suspended catalyst system can be employed. The rate of diolefin addition will depend and should be controlled with respect to the amount of catalyst present or charged to the system. When the operation is continuous the rate of diolefin addition will, of course, depend upon the rate of addition of catalyst to the system. The amount of catalyst employed will depend upon the desired rate of polymer production and the capacity of the polymerization equipment and its ability to handle or to dissipate heat of reaction. In general, the catalyst in the reaction zone will be present in an amount in the approximate range 0.01–20 weight percent of the monomer there present.

The oily liquid polymer of the invention can be recovered from the process and from the catalyst by conventional techniques. Such techniques include, for example, evaporation, solvent extraction, filtration, or combinations of these, as will be evident to one skilled in the art having studied this disclosure.

*Example I*

The catalyst was prepared by contacting 47.07 g. (60 ml.) of 20–60 mesh eta alumina (Davison SMR–55–8244) with a solution containing 3.8 g. ammonium acid fluoride in 75 ml. water. The slurry was allowed to stand about 2.5 hours at room temperature, after which it was filtered. The solids were dried and then air activated for 16 hours at 550° C. This prepared catalyst, containing about 4 weight percent fluorine, was utilized in a preliminary 1,3-butadiene polymerization of an exploratory nature. It is regenerated by repeating the air activation and used in the following run which illustrates the invention.

The catalytic run was carried out with 7.42 g. (10 ml.) of the catalyst in a 16 mm. O.D. glass reactor, fitted with a coaxial thermocouple well for temperature measurement, and mounted within a metal shield in a vertical resistance furnace. A 5 ml. bed of low surface area alpha alumina pills was placed above the catalyst bed for preheat. The reactor and contents were preconditioned by heating at 500° C. for a short period to remove stray moisture which may have gained entry during the apparatus assembly. After such preconditioning, dry nitrogen was passed through the system until the actual run began.

Using 1,3-butadiene as a feed, through the reactor, a 110 minute run was carried out at 130° C. and at atmospheric pressure. During this period the resulting oily polymer was retained in the catalyst bed. After the run, the catalyst bed was extracted with cyclohexane in a Sohxlet extractor. After evaporating the cyclohexane, 2.51 g. of a slightly viscous, greenish-yellow oil was recovered indicating a conversion of about 22 percent. It was kept in a sealed vial while awaiting testing.

The polymerized butadiene oil was tested by applying it as a thin film on a metal test panel. This film was found to dry hard in 4 hours. This was significantly superior to conventional butadiene drying oils such as that produced over metallic sodium which generally require 8 hours or more to dry. On extended drying, the invention exhibited good toughness, flexibility and lack of brittleness.

A like operation conducted under elevated pressure in liquid phase also yields a liquid oily polymer having drying characteristics similar to those of the polymer obtained above.

The "spent" liquid hydrofluoric acid alkylation catalyst which can be used to fluoride, or fluorinate, an alumina catalyst, such as a natural or synthetic alumina cracking catalyst, to prepare the polymerization catalyst which is used in this invention, can be obtained as described in the following example.

*Example II*

In lieu of the catalyst of the foregoing example there is employed a catalyst which is prepared by contacting eta alumina pellets with spent HF alkylation catalyst comprising an organic fluoride-containing oil removed from an operation in which an olefin mixture, which usually can propylene and butylene, is used to alkylate isobutane in the presence of hydrofluoric acid to produce an alkylate suitable for use as a blending stock in preparation of high grade motor fuel, as set forth in U.S. Patent 2,773,920, issued December 11, 1956, to Lucien H. Vautrain and Edward Strunk. Results obtained are similar to those of the foregoing examples.

The results can be varied by varying the quantity of the catalyst soluble oil which is present in the spent HF catalyst obtained from the alkylation operation. The catalyst soluble oil is known to contain organic fluorine containing compounds. The amount of spent alkylation catalyst used to prepare the polymerization catalyst is varied responsive to the analysis of results which are obtained when subjecting the conjugated diolefin or diene to polymerization employing the fluorided pellets. The extent to which the alkylation catalyst is spent or the catalyst soluble oil content thereof, as well as the time and extent of contact of the alumina, as well as the character of the particular alumina selected will influence the results obtained in the sense that the *films* or the oils obtained from the particular diene will exhibit different rates of drying and hardnesses.

Reasonable variation and modification are possible within the scope of the foregoing disclosure and the appended claims to the invention, the essence of which is that it has been found that by fluoriding an alumina catalyst, such as a synethetic or natural alumina cracking catalyst, there is obtained a catalyst suitable for polymerizing conjugated diolefins to oily liquid polymers, as distinguished from their dimer products; and that a new oily liquid polymer product, thus prepared, has been provided having fast-drying and flexible film-forming properties.

We claim:

1. A process for the polymerization of a conjugated diolefin to a liquid polymer having an average molecular weight greater than that of the dimer of said diolefin which comprises contacting said diolefin with an activated fluorided alumina catalyst containing approximately 2–20 weight percent of fluorine at an elevated temperature in the approximate range 80–250° C. and recovering said liquid polymer from the catalyst.

2. A process according to claim 1 wherein the catalyst is obtained by impregnating an alumina catalyst with a spent alkylation catalyst obtained from an alkylation in which hydrofluoric acid is employed as the catalyst.

3. A process for the polymerization of an acyclic conjugated diolefin having 4–15 carbon atoms per molecule which comprises contacting said diolefin under polymerization conditions including an elevated temperature with an activated fluorided alumina polymerization catalyst in the approximate range of 80–250° C. and recovering a liquid polymer having an average molecular weight greater than that of the dimer from said catalyst.

4. A process for the preparation of a film-forming liquid polymer of a conjugated diolefin having 4–15 carbon atoms per molecule, said polymer having an average molecular weight greater than that of the dimer of said diolefin, which comprises contacting said diolefin in vapor phase with an activated fluorided alumina polymerization catalyst at an elevated temperature in the approximate range 80–250° C. sufficient to induce polymerization of said diolefin and for a time sufficient to prepare a desired amount of said diolefin polymer and recovering said liquid polymer from said catalyst.

5. A process according to claim 4 wherein a diluent is employed to aid in said contacting and the catalyst is made from an alumina hydrocarbon cracking catalyst.

6. A process according to claim 4 wherein the catalyst is present in an amount in the approximate range of 0.01–20 weight percent of the monomer present in the reaction zone.

7. A process for the preparation of an oily liquid polydiolefin which comprises contacting an aliphatic conjugated diolefin having 4–15 carbon atoms per molecule to polymerization conditions, including an elevated temperature sufficient to induce polymerization of the diolefin in the approximate range 80–250° C., in vapor phase, with a fluorinated eta alumina catalyst containing approximately 2–20 weight percent fluorine, said catalyst having been prepared by impregnating eta alumina of approximately 20–60 mesh with a water solution of ammonium acid fluoride, allowing to stand for thorough impregnation, and then drying and air activating at a temperature in the range of the order of about 400–800° C. for a period of time in the approximate range 0.1–50 hours.

8. A process for the preparation of a liquid polybutadiene having an average molecular weight substantially in excess of the dimer which comprises contacting 1,3-butadiene, in vapor phase, under polymerization conditions including an elevated temperature in the approximate range 80–250° C., with an activated fluorided alumina polymerization catalyst, said catalyst containing approximately 2–20 weight percent fluorine and having been prepared by impregnating an alumina catalyst with a fluorine-containing material effective to produce said fluorided alumina polymerization catalyst and then heating the resultant catalyst material to activate the same.

References Cited by the Examiner

UNITED STATES PATENTS

| 2,246,900 | 6/1941 | Schulze et al. | 252—441 |
| 2,355,392 | 8/1944 | Oberfell | 260—680 X |
| 2,460,973 | 2/1949 | Calfee et al. | 260—683.15 X |
| 3,035,013 | 5/1962 | Cull et al. | 260—680 X |

DELBERT E. GANTZ, *Primary Examiner.*

R. H. SHUBERT, *Assistant Examiner.*